July 4, 1944.     M. ALPERIN     2,352,607
FLUID FLOW INDICATING AND MEASURING MEANS
Filed Aug. 21, 1942     2 Sheets-Sheet 2

Fig 8

INVENTOR
MORTON ALPERIN
BY
ATTORNEYS

Patented July 4, 1944

2,352,607

UNITED STATES PATENT OFFICE 2,352,607

FLUID FLOW INDICATING AND MEASURING MEANS

Morton Alperin, Dayton, Ohio

Application August 21, 1942, Serial No. 455,587

20 Claims. (Cl. 73—212)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to apparatus for indicating and measuring the flow of fluid such as of an air stream, or of liquid past a fixed point, or the relative movement of a body of water in respect to a vessel. More particularly, the invention relates to apparatus for measuring the static, dynamic, and total pressures produced by a flow of fluid and for indicating the direction of movement of the fluid stream with respect to some object.

A principal object of the invention is to provide apparatus enabling the simultaneous and instantaneous measurement of the static, dynamic, and total pressures produced by the movement of a fluid stream, by the employment of a single device or instrument placed in the fluid stream.

Another object of the invention is to provide a device of the character referred to by which more accurate measurement of static, dynamic, and total pressures of a fluid stream may be accomplished.

Another object of the invention is to provide apparatus of the character described including a device or instrument of the type above referred to and means in conjunction therewith for enabling accurate determination of the angle of flow or direction of movement of a fluid stream with respect to some reference line.

Another object of the invention is to provide apparatus of the character referred to which will enable accurate measurement of static pressure, dynamic pressure, total pressure, and angle of flow, of a fluid stream at any desired point therein regardless of the proximity of such point to the source of such fluid stream.

Another object of the invention is to provide apparatus of the character referred to which will enable measurement and indication of the respective pressures and angle of flow without the necessity for laborious adjustment and calculation.

Another object of the invention is to provide a device of the character referred to which may be quickly positioned properly in a fluid stream for the purposes mentioned.

Devices in use heretofore have been incapable of simultaneous and instantaneous measurement and indication of static, dynamic, and total pressures and angle of flow of a fluid stream at the same point therein. The measurement of each of these characteristics of a fluid stream has usually required the placing of a separate instrument in the fluid stream for the measurement or indication of each particular characteristic. For instance, the measurement of the dynamic pressure of a fluid stream is ordinarily accomplished by the use of a Pitot tube placed therein, but such a device is incapable of the measurement of either static pressure or total pressure, or angle of flow. Devices for measuring the static pressure, such as that disclosed in Patent No. 1,834,392, issued December 1, 1931, are incapable of measuring dynamic pressure or angle of flow. Devices heretofore employed for indicating the angle or direction of flow of a fluid stream have been incapable of measuring either static pressure or dynamic pressure.

The apparatus of the invention enables the accomplishment of all these various measurements instantaneously and simultaneously through the medium of a single device placed in the fluid stream. The embodiment of the invention herein disclosed includes a receiver body having an arcuate periphery, said receiver body being in the form of a cylinder having two passages therein communicating respectively with one of two openings located at circumferentially spaced points on the arcuate periphery of said cylinder, the latter having a third passage communicating with a third opening located at a third point on the arcuate periphery of said cylinder equally spaced circumferentially from the two first-mentioned points. This receiver device is designed to be placed in the fluid stream and the openings are so arranged on the periphery of the cylinder that when the pressure is equal at the first two points defined by two of the openings, the influence of dynamic pressure of the fluid stream will be negligible at either of said first two points and the total pressure of the fluid stream will be applied at, and the fluid stream will be directed toward, the third opening which, at such time, is necessarily aligned with the axis of flow of the fluid stream and facing in a direction opposite to the direction of flow of said stream.

With a device of the character described a manometer placed in communication with the first two passages will serve to indicate when the tube is positioned so that the pressure is equal at the two points on the arcuate periphery of the receiver body with which said first two passages are in communication. By reason of the placing of two of the openings it is known that, when the manometer indicates a condition of equal pressure thereat, a suitable gauge placed in communication with one of said openings will measure the static pressure of a fluid stream; also by reason of the placing of the third opening it is known that under a condition of equal pressure at the first two openings, a suitable gauge placed in communication with the passage leading to said third opening will measure the total pressure of the fluid flow.

The apparatus of the invention includes an indicator on the arcuate body of the cylinder aligned with the third opening, and fixed indicia means cooperable with the indicator whereby to indicate the position of the third opening with respect to said indicia means upon rotation of the arcuate body about a fixed axis relative to said indicia means. Thus, by noting the position of the indicator relative to the indicia means when the manometer indicates a condition of equalized pressure, the angle or direction of flow of the fluid stream is thereby indicated because of the relation of the indicator to the third opening.

Other objects, advantages, and features of novelty will become apparent as the description of the invention proceeds in conjunction with the accompanying drawings, in which.

Now referring to the drawings and describing the invention more in detail, the receiver device of my invention is generally indicated by the letter A. This receiver device is the portion of the apparatus which is designed to be placed within a fluid stream for receiving the influence of static, dynamic, and total pressures of said fluid stream in the vicinity of a certain point therein. The receiver device A, as illustrated, comprises a hollow cylinder 1 within which are positioned two hollow tubes 3 and 4. These hollow tubes 3 and 4 are imbedded in a solid body 5 of material such as solder or the like, filling the cylinder 1 up to the point indicated by the dotted line designated by the letter X in Figure 1, said body of material 5 serving to seal one end of the cylinder 1 and one end of each of the tubes 3 and 4, namely the left ends of said tubes and cylinder, viewing Figure 1. The tubes 3 and 4 extend outwardly through one end of the cylinder 1, namely the right end, viewing Figure 1, through a body 6 of material, such as solder or the like, which is provided in the space adjacent the upper end of the cylinder 1, or the right end, viewing Figure 1, which body of material 6 is spaced from the body of material 5 and serves to seal said upper end of the cylinder 1 and the space 7 between said bodies and to align the tubes 3 and 4 so that they extend substantially parallel to the longitudinal axis of the cylinder 1. Cylinder 1 is provided with openings 8 and 9 located at circumferentially spaced points on the arcuate periphery of the cylinder and a passage 10 drilled through the body of material 5 provides communication between the tube 3 and the opening 8. Similarly a passage 11 drilled through the body of material 5 provides communication between the tube 4 and the opening 9. A third opening 12 through the cylinder 1 located at a third point on the periphery of said cylinder is equally spaced circumferentially from the openings 8 and 9. A passage 13 drilled into the body of material 5 provides communication between the opening 12, and a passage 14 likewise drilled in the body of material 5 and extending substantially parallel to the longitudinal axis of the tubes 3 and 4 and cylinder 1. The passage 14 communicates with the space 7 between the bodies of solder 5 and 6. Extending through the body of solder 6 and communicating with the space 7 is a third tube 15.

Figure 1:
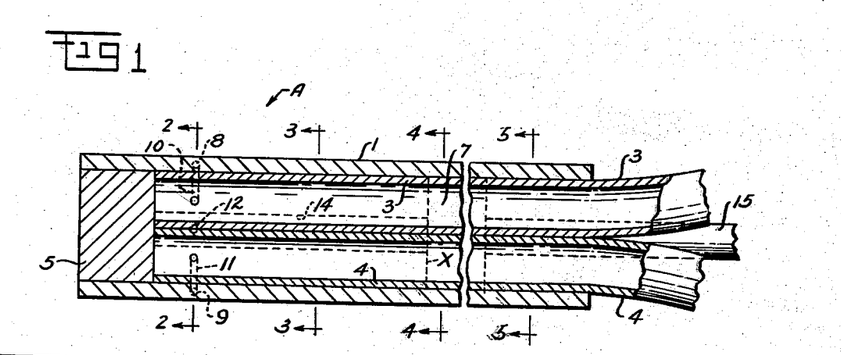
Figure 1 is a longitudinal sectional view of the receiver device or portion of the apparatus of my invention which is designed to be placed within the fluid stream for receiving the static, dynamic, and total pressures thereof to be measured.
Figures 2, 3, 4, 5:
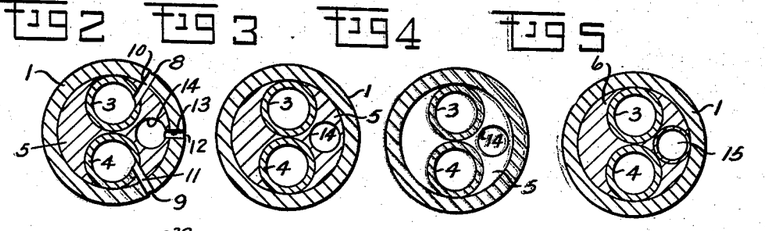
Figure 2 is a transverse sectional view taken on the line 2—2 of Figure 1, looking in the direction of the arrows.
Figure 3 is a transverse sectional view taken on the line 3—3 of Figure 1, looking in the direction of the arrows.
Figure 4 is a transverse sectional view taken on the line 4—4 of Figure 1, looking in the direction of the arrows.
Figure 5 is a transverse sectional view taken on the line 5—5 of Figure 1, looking in the direction of the arrows.

From the foregoing it will be understood that the openings 8 and 9 communicate with the tubes 3 and 4 respectively and the opening 12 communicates with the space 7 in the cylinder 1 between the bodies of solder 5 and 6 and through said space 7 said opening 12 communicates with the tube 15. Hence, each of the openings 8, 9, and 12 communicates separately with one of the tubes 3, 4, and 15, respectively which lead to the exterior of cylinder 1.

Particular notice should be taken of the arrangement of the openings 8, 9, and 12. The openings 8 and 9 are circumferentially spaced on the arcuate periphery of the cylinder 1 and preferably, though not necessarily, in the same plane perpendicular to the longitudinal axis of the cylinder 1. The opening 12 is equally spaced circumferentially from each of the openings 8 and 9 and preferably, though again not necessarily, in the same plane perpendicular to the longitudinal axis of the cylinder 1. The arrangement of the openings 8, 9 and 12 is such that when the cylinder 1 is placed in a fluid stream and the movement of said stream is directly toward the opening 12, and said opening 12 is aligned with the axis of flow of the fluid stream, the influence of dynamic pressure of the fluid stream at the points on the periphery of the cylinder 1, defined by the openings 8 and 9, will be substantially negligible. By reason of the fact that the opening 12 is circumferentially equally spaced from the openings 8 and 9, it will be evident that, under the condition mentioned, the pressure at the points on the periphery of the cylinder 1 defined by the openings 8 and 9 will be equal. Consequently, by reason of the arrangement of the openings 8, 9, and 12 there is afforded a means of aligning the opening 12 with the axis of flow of the fluid stream. This is accomplished by connecting a manometer, or means for indicating pressure differential, between openings 8 and 9 and noting when the manometer indicates the condition of equalized pressure between the openings 8 and 9.

By reason of the fact that the openings 8 and 9 are located at the points on the arcuate periphery of the cylinder 1 at which the influence of dynamic pressure is negligible when the pressure at said openings 8 and 9 is equal, the arrangement affords a means of ascertaining the static pressure of the fluid stream within which the receiver is positioned. This is accomplished by connecting a pressure-indicating means in communication with one of the openings 8 or 9. In other words the openings 8 and 9 are so located on the periphery of the cylinder 1 that when the pressure at said openings is equal, said pressure will be equal to the static pressure of the fluid stream.

In connection with the action of forces produced by a fluid stream upon a circular cylinder, it is known that the points on the arcuate periphery thereof at which the influence of dynamic pressure is practically zero are located at an angle of about 40° on either side of the point on the arcuate periphery of the cylinder at which the direction of fluid flow is toward the arcuate periphery of the cylinder and perpendicular to the longitudinal axis thereof and to the tangent to said periphery at such point. From experience it has been found that this angle is nearer 39¼°. Hence, the openings 8 and 9 are circumferentially spaced approximately 80° (preferably about 78½°) apart around the arcuate periphery of the cylinder 1, and the opening 12, equally spaced circumferentially from each of the openings 8 and 9, is at an angle of approximately 40 degrees from each of said openings 8 and 9. From the foregoing it is clear, therefore, that when the pressure is equal at the points on the arcuate periphery of the cylinder 1 defined by the openings 8 and 9, the influence of dynamic pressure of the fluid stream is negligible at said points and the pressure at either of said points, defined by openings 8 and 9, is equal to the static pressure of the fluid stream. Likewise it is clear that under the condition mentioned of equalized pressure at the openings 8 and 9, the direction of the fluid stream will be directly toward the opening 12, and said opening 12 aligned with the axis of flow of said fluid stream, so that the total pressure of said fluid stream will be applied at the opening 12 when the pressure at the openings 8 and 9 is equal.

The apparatus of the invention has been particularly designed for use in connection with the measurement of static, dynamic, and total pressures of an air stream, and the angle of flow of such air stream, in a wind tunnel. For the purpose of the use of the apparatus of the invention in such application, means for mounting the receiver device in a wind tunnel and means for determining the position of rotation of said receiver with respect to some reference point, enabling the indication of the angle of flow of the air stream, have been shown in Figures 6 and 7. Referring now more in particular to said Figures 6 and 7, a portion of a cylindrical wind tunnel is indicated at 16. At the top of the wind tunnel 16 there is provided a radial opening or passage 17 through which the receiver device A may be inserted so that the portion thereof, provided with the openings 8, 9, and 12, is positioned within the interior of the wind tunnel, and a portion of said receiver A extends exteriorly of the wind tunnel. Mounted to rest on top of the wind tunnel is a support or stand 18 for supporting the receiver A in a desired position with respect to the tunnel 16. The supporting means or stand 18 has fixed thereto a sleeve member 19 within which the receiver A is receivable, the cylinder 1 being inserted therein and located in any desired position vertically by means of a set screw 20 provided on the sleeve 19 and engageable with the cylinder 1 when the latter is positioned within the sleeve 19. Adjacent the upper end of the receiver A there is provided an indicator member 21 fixed to the cylinder 1, the indicator 21 being provided with an indication line or marking 22 which, by the initial positioning of the indicator 21, is aligned with the opening 12 of the cylinder 1, said indicator 21 and line 22 being on the same side of the cylinder 1 as the opening 12.

Figure 6:
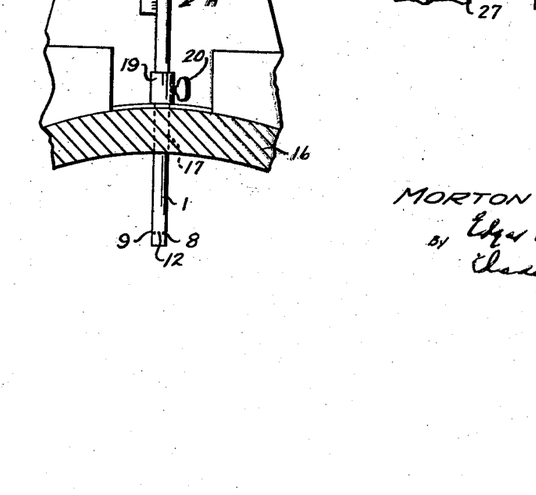
Figure 6 is a side elevation of apparatus of my invention including the receiver device, flow angle measuring means, and supporting means, the instrumentalities being shown as mounted in conjunction with a wind tunnel shown in partial section.
Figure 7:
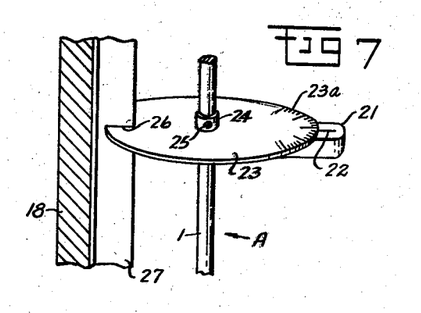
Figure 7 is a perspective view, partly in section, showing more in detail certain of the instrumentalities illustrated in Figure 6.

Fixed indicia means is provided for cooperation with the indicator 21 to indicate the position of rotation of the cylinder 1 about its longitudinal axis. Said fixed indicia means comprises a circular plate 23 having a suitable axial opening through which the cylinder 1 may extend so that the circular periphery of the plate 23 encircles the cylinder 1 and is concentric with the axis thereof, said circular indicia plate 23 being provided with a hub 24 encircling the cylinder 1 when the latter extends through said plate. The hub 24 is provided with a set screw 25 engageable with cylinder 1 to maintain the plate 23 and cylinder 1 against relative rotation when the desired rotative position of the cylinder 1 has been determined. The plate 23 is provided on its upper face with indicia 23a cooperable with the indication line 22 on the indicator 21 for indicating the rotative position of the opening 12 with respect to indicia plate 23. The indicia plate 23 is provided with a radial slot 26 and the support or stand 18 is provided with a vertically extending offstanding tongue 27 extending perpendicular to the longitudinal axis of the tunnel 16 and engageable in a groove 26 of the plate 23 to maintain the latter against rotation relative to the tunnel 16 when mounted in position encircling the cylinder 1.

The cylinder 1 being desirably intended to be movable to different fixed positions along its longitudinal axis, which also is perpendicular to the longitudinal axis of the tunnel 16 and parallel to the tongue 27, it will be apparent that the receiver A may be raised and lowered respecting the sleeve 19 upon loosening the set screw 20 and, under such condition of raising and lowering movement of the receiver A, the tongue 27 will always engage in the groove 26 to maintain the indicia plate 23 against rotation with respect to the wind tunnel 16. The support or stand 18 may be provided with a suitable vertical scale 28 cooperable with the indicia plate 23 for indicating the radial position of openings 8, 9, and 12 with respect to tunnel 16.

It may be parenthetically noted that while the openings 8, 9, and 12 are preferably, though not necessarily located in the same circumferential plane, said openings are desirably located as close together as possible within the limitations of their necessary positioning as above described, so that the respective static and total pressures of the air stream applied at said openings will be those pressures at substantially the same location in the air stream.

Figure 8:
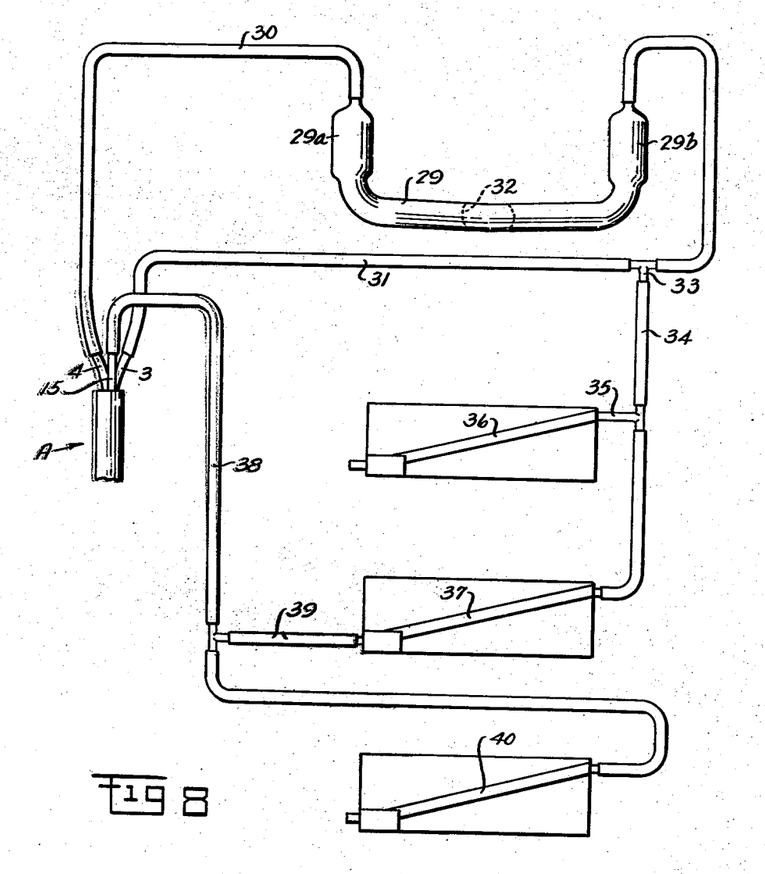
Figure 8 is a diagrammatic view showing the receiver device in conjunction with instrumentalities for indicating the pressure differential at two points defined by two of the openings on the periphery of the receiver and instrumentalities for measuring static, dynamic, and total pressure of a fluid stream within which the receiver is positioned.

Figure 8 shows in a somewhat diagrammatic manner the apparatus employed in connjunction with the receiver A including means for indicating pressure differential between the points in the fluid stream defined by the openings 8 and 9 within which that portion of the receiver A is positioned; the means for measuring total pressure of the air stream applied at the opening 12; the means for measuring dynamic pressure of the air stream, which is equivalent to the difference between the total pressure and the static pressure; and the means for measuring the static pressure of the air stream which is equal to the pressure at the point on an arcuate periphery of the cylinder 1 where the influence of dynamic pressure is negligible. Figure 8 shows the manner of connection of the various measuring means just mentioned in conjunction with the receiver A so that the static, dynamic, and total pressures of the air stream within which the receiver A is positioned may be measured simultaneously.

Now describing the connection of said measuring means more in detail, Figure 8 shows pressure differential indicating means comprising a manometer 29 designed in the form of a level pressure indicator. The opposite sides or legs 29a and 29b communicate respectively with hollow tubes 30 and 31 which are in communication with the tubes 4 and 3 respectively of the receiver A. The manometer 29 is transparent and has a bubble of liquid 32 therein, which seeks the position indicated in Figure 8 at the lowest point of the manometer tube 29 when the air pressure applied to the manometer 29 at each side of the bubble 32 is equal. When the receiver A is positioned as shown in Figure 6 so that an air stream in the tunnel 16 is directed generally toward the openings 8, 9, and 12, and the manometer 29 is connected in communication with the openings 8 and 9 as described, it will be apparent that said manometer 29 will indicate a condition of no pressure differential, or equalized pressure, at the openings 8 and 9 when the bubble 32 assumes the position indicated in Figure 8. Likewise it will be apparent that, under the condition stated, the pressure being equal at the openings 8 and 9, the pressure at either of said openings 8 or 9 will be equal to the static pressure of the air stream in the wind tunnel 16. Hence, a pressure indicator connected in communication with either of the openings 8 or 9 will, under the condition stated, indicate the static pressure of the air stream in the wind tunnel 16. The manner of connection of a pressure indicator with the receiver A for the purpose of indicating static pressure of the air stream in a tunnel 16 may be as follows: A T-connection 33 may be provided in either of the tubes 30 or 31, said connection 33 being shown in Figure 8 as provided in the line 31 for placing in communication therewith a hollow tube 34 which communicates through the T-connection 35 with a pressure indicator tube 36, which is thereby placed in communication, through the tube 3, with the opening 8 on the arcuate periphery of the cylinder 1 so that the pressure tube or gauge 36 will indicate static pressure of the air stream in the wind tunnel 16 when the latter is directed toward the openings 8, 9, and 12 and the manometer 29 indicates a condition of balanced pressure at the openings 8 and 9.

For the purpose of indicating dynamic pressure of the air stream in tunnel 16 a pressure indicator tube or manometer 37 may be connected so that one side will be in communication with one of the openings 8 or 9 in the receiver A and the other side of manometer 37 will be in communication with the opening 12 of said receiver. To this end, as shown in Figure 8, one side of the manometer 37 is placed in communication with the opening 8 through tubes 34, 31, and 3; and a tube 38 communicating with the tube 15 of receiver A is placed in communication with the other side of the pressure indicator tube or gauge 37 through a tube 39 so that this side of the indicator 37 is in communication with the opening 12. When the air stream is directed toward the openings 8, 9, and 12 and the manometer 29 indicates a condition of equalized pressure at the openings 8 and 9 the total pressure of the air stream will be applied to the opening 12 and, through the tubes 38 and 39, said total pressure will in turn be applied to one side of the pressure indicator tube 37. Under such condition, pressure equal to the static pressure of the air stream will be applied to the opposite side of the pressure indicator 37 through the tubes 3, 31, and 34 so that the pressure indicator 37 will indicate the difference between the total pressure and the static pressure of the air stream which is equal to the dynamic pressure thereof.

For the purpose of indicating the total pressure of the air stream the tube 38 may be connected in communication with one side of a pressure indicator tube 40 thus placing the latter in communication with opening 12, so that the pressure applied at the opening 12 of the receiver A is indicated by the pressure indicator 40. When the air stream is directed toward the openings 8, 9, and 12 and the manometer 29 indicates a condition of equalized pressure at the openings 8 and 9 it will be apparent that the pressure indicator 40 will measure the total pressure of the air stream in the tunnel 16.

The pressure indicators 36, 37, and 40 may comprise transparent manometer tubes within which a suitable liquid is provided to be acted upon by the pressure supplied thereto for indicating said pressures by the position of liquid in such manometer tubes in conjunction with a scale mounted behind the respective tubes 36, 37, and 40.

In the use of the apparatus disclosed herein for the purposes of measuring and indicating the static, dynamic, and total pressures of an air stream in a wind tunnel and for measuring the angle of flow of said air stream therein, a plurality of radial openings 17 may be provided in the tunnel 16 to receive cylinder 1 so that measurements may be made of the various pressures and angles of flow at different locations in the wind tunnel with reference to the source of the air stream. In operation, the cylinder 1 will be inserted through one of the openings 17 in the wind tunnel 16 so that the openings 8, 9, and 12 are within the air stream and facing generally toward the source thereof and the receiver A is adjusted to the desired position radially of the wind tunnel 16 by moving the cylinder 1 vertically up or down until indicia plate 23 assumes the desired position relative to the scale 28 and the receiver A is then fixed in such desired vertical position by the set screw 20. Now the cylinder 1 may be rotated about its longitudinal axis by moving the indicator 21 until the manometer 29 indicates a condition of equalized pressure at the openings 8 and 9. By noting the position of the indication line 22 with respect to the indicia 23a, the angle of flow of the air stream in the wind tunnel 16 may be ascertained with reference to the longitudinal axis of the wind tunnel, which axis may be indicated on the indicia plate 23 as the zero angle or base line.

For the purpose of measuring the angle or direction of flow of the air stream, the indicia 23a may be marked off in degrees around the periphery of the indicia plate 23. Thus, when the cylinder 1 has been rotated by the indicator 21 relative to the indicia plate 23 until the manometer 29 is indicating a condition of equalized pressure, the position at which the indication line 22 stands with respect to the indicia 23a will indicate the angle of flow of the air stream with respect to the longitudinal axis of the wind tunnel 16. Since, under the condition just mentioned of equalized pressure indicated by the manometer 29, the total pressure of the air stream will be applied at the opening 12, said total pressure will be simultaneously and instantaneously indicated by the pressure indicator gauge 40. Likewise under the condition just mentioned of equalized pressure at the openings 8 and 9 indicated by the manometer 29, and by reason of the fact that said openings 8 and 9 will at such time be located at points on the arcuate periphery of the cylinder 1 at which the influence of dynamic pressure is negligible, the static pressure of the air stream will be simultaneously indicated by the pressure indicator gauge 36 connected in communication with the opening 8. Similarly under the condition mentioned of equalized pressure at the openings 8 and 9 indicated by the manometer 29, the pressure indicator 37 will indicate a difference between the total pressure of the air stream and the static pressure thereof which difference in said pressures is equal to the dynamic pressure of the air stream.

From the foregoing it will be apparent that the invention makes possible the simultaneous and instantaneous measurement and indication of the total pressure, dynamic pressure, static pressure, and direction or angle of flow of a fluid stream without any necessity for laborious calculation and adjustment of the apparatus and merely by reading the respective gauges and angle measuring means employed in conjunction with a single receiver positioned within the fluid stream.

Having thus described my invention, what I claim as new and desire to secure by Letters Patent is:

1. Fluid flow indicating and measuring means of the class described, comprising a receiver body having an arcuate periphery and two openings therein located at circumferentially spaced points on said arcuate periphery, said receiver body having two passages therein each communicating respectively with one of said two openings, said body having a third opening located at a third point on the arcuate periphery of said body equally spaced circumferentially from said aforementioned two points, said body having a third passage communicating with said third opening, said passages leading from the respective openings through said body and communicating with the exterior thereof at points remote from said openings, the said first two openings being arranged on the periphery of the body in such a manner that when the pressures are equal at both of said first two points the influence of dynamic pressure of a fluid stream within which said body is positioned will be negligible at either of said first two points and the third opening will be aligned with the axis of, and facing in a direction opposite to the direction of flow of, said fluid stream.

2. Fluid flow indicating and measuring means of the class described, comprising a receiver body having an arcuate periphery and two openings therein located at circumferentially spaced points on said arcuate periphery, said receiver body having two passages therein each communicating respectively with one of said two openings, said body having a third opening located at a third point on the arcuate periphery of said body equally spaced circumferentially from said aforementioned two points, said body having a third passage communicating with said third opening, said passages leading from the respective openings through said body and communicating with the exterior thereof at points remote from said openings, said openings being arranged on the periphery of the body in such a manner that when the pressures are equal at both of said first two points the influence of dynamic pressure of a fluid stream within which said body is positioned will be negligible at either of said first two points and the total pressure of the fluid stream will be applied at said third opening.

3. Fluid flow indicating and measuring means of the class described, comprising a receiver body having an arcuate periphery and two openings therein located at circumferentially spaced points on said arcuate periphery, said receiver body having two passages therein each communicating respectively with one of said two openings, said body having a third opening located at a third point on the arcuate periphery of said body equally spaced circumferentially from said aforementioned two points, said body having a third passage communicating with said third opening, said passages leading from the respective openings through said body and communicating with the exterior thereof at points remote from said openings, said openings being arranged on the periphery of the body in such a manner that when the pressures are equal at both of said first two points the influence of dynamic pressure of a fluid stream within which said body is positioned will be negligible at either of said first two points and the total pressure of said fluid stream will be applied at the third opening, and means communicating with one of said first two passages and with said third passage for indicating dynamic pressure of said fluid stream when the pressures at both of said first two points are equal.

4. Fluid flow indicating and measuring means of the class described, comprising a receiver body having an arcuate periphery and two openings therein located at circumferentially spaced points on said arcuate periphery, said receiver body having two passages therein each communicating respectively with one of said two openings, said body having a third opening located at a third point on the arcuate periphery of said body equally spaced circumferentially from said aforementioned two points, said body having a third passage communicating with said third opening, said passages leading from the respective openings through said body and communicating with the exterior thereof at points remote from said openings, said openings being arranged on the periphery of the body in such a manner that when the pressures are equal at both of said first two points the influence of dynamic pressure of a fluid stream within which said body is positioned will be negligible at either of said first two points and the total pressure of the fluid stream will be applied at said third opening, means communicating with said first two passages for indicating the pressure differential of the fluid stream at said first two points, and means communicating with one of said first two passages and with said third passage for indicating the dynamic pressure of said fluid stream when said pressure differential between said first two points is substantially zero.

5. Fluid flow indicating and measuring means of the class described, comprising a receiver body having an arcuate periphery and two openings therein located at circumferentially spaced points on said arcuate periphery, said receiver body having two passages therein each communicating respectively with one of said two openings, said body having a third opening located at a third point on the arcuate periphery of said body equally spaced circumferentially from said aforementioned two points, said body having a third passage communicating with said third opening, said passages leading from the respective openings through said body and communicating with the exterior thereof at points remote from said openings, said openings being arranged on the periphery of the body in such a manner that when the pressures are equal at both of said first two points the influence of dynamic pressure of a fluid stream within which said body is positioned will be negligible at either of said first two points and the total pressure of said fluid stream will be applied at the third opening, means communicating with one of said first two passages and with said third passage for indicating dynamic pressure of said fluid stream when the pressures at both of said first two points are equal, and means communicating with one of said first two passages for indicating the static pressure of said fluid stream when the pressures at said first two points are equal.

6. Fluid flow indicating and measuring means of the class described, comprising a receiver body having an arcuate periphery and two openings therein located at circumferentially spaced points on said arcuate periphery, said receiver body having two passages therein each communicating respectively with one of said two openings, said body having a third opening located at a third point on the arcuate periphery of said body equally spaced circumferentially from said aforementioned two points, said body having a third passage communicating with said third opening, said passages leading from the respective openings through said body and communicating with the exterior thereof at points remote from said openings, said openings being arranged on the periphery of the body in such a manner that when the pressures are equal at both of said first two points the influence of dynamic pressure of a fluid stream within which said body is positioned will be negligible at either of said first two points and the total pressure of said fluid stream will be applied at the third opening, means communicating with one of said first two passages and with said third passage for indicating dynamic pressure of said fluid stream when the pressures at both of said first two points are equal, and means communicating with said third passage for indicating the total pressure of said fluid stream when the pressures at said first two points are equal.

7. Fluid flow indicating and measuring means of the class described, comprising a receiver body having an arcuate periphery and two openings therein located at circumferentially spaced points on said arcuate periphery, said receiver body having two passages therein each communicating respectively with one of said two openings, said body having a third opening located at a third point on the arcuate periphery of said body equally spaced circumferentially from said aforementioned two points, said body having a third passage communicating with said third opening, said passages leading from the respective openings through said body and communicating with the exterior thereof at points remote from said openings, said openings being arranged on the periphery of the body in such a manner that when the pressures are equal at both of said first two points the influence of dynamic pressure of a fluid stream within which said body is positioned will be negligible at either of said first two points and the total pressure of the fluid stream will be applied at said third opening, means communicating with one of said first two passages for indicating the static pressure of said fluid stream when the pressures at said first two points are equal, and means communicating with said third passage for indicating the total pressure of said fluid stream when the pressures at said first two points are equal.

8. Fluid flow indicating and measuring means of the class described, comprising a receiver body having an arcuate periphery and two openings therein located at circumferentially spaced points on said arcuate periphery, said receiver body having two passages therein each communicating respectively with one of said two openings, said body having a third opening located at a third point on the arcuate periphery of said body equally spaced circumferentially from said aforementioned two points, said body having a third passage communicating with said third opening, said passages leading from the respective openings through said body and communicating with the exterior thereof at points remote from said openings, said openings being arranged on the periphery of the body in such a manner that when the pressures are equal at both of said first two points the influence of dynamic pressure of a fluid stream within which said body is positioned will be negligible at either of said first two points and the total pressure of said fluid stream will be applied at the third opening, means communicating with one of said first two passages and with said third passage for indicating dynamic pressure of said fluid stream when the pressures at both of said first two points are equal, means communicating with one of said first two passages for indicating the static pressure of said fluid stream when the pressures at said first two points are equal, and means communicating with said third passage for indicating the total pressure of said fluid stream when the pressures at said first two points are equal.

9. Fluid flow indicating and measuring means of the class described comprising a cylinder having two openings located approximately 80° apart on the arcuate periphery of said cylinder, said cylinder having two passages therein, each of said passages communicating respectively with one of said two openings, said cylinder having a third opening located at a third point on the arcuate periphery of said cylinder equally spaced circumferentially from said aforementioned two points and intermediate the same and approximately 40° from each of said aforementioned two points, said cylinder having a third passage communicating with said third opening, said passages leading from the respective openings through said body and communicating with the exterior thereof at points remote from said openings.

10. Fluid flow indicating and measuring means of the class described, comprising, in combination, a receiver body having an arcuate periphery and two openings therein located at circumferentially spaced points on said arcuate periphery, said receiver body having two passages therein each communicating respectively with one of said two openings, said passages leading from the respective openings through said body and communicating with the exterior thereof at points remote from said openings and being adapted for connection at said remote points with means for indicating the pressure differential, at said circumferentially spaced points, of a fluid stream within which said body is positioned, said body having a third opening located at a third point on the arcuate periphery of said body equally spaced circumferentially from said aforementioned two points, said body having a third passage communicating with said third opening, an indicator on said body for indicating the position of the third opening with respect thereto, and fixed indicia means cooperable with said indicator for indicating the position of said third opening with respect to said indicia means upon rotation of said body about a fixed axis relative to said indicia means, whereby when the pressures are equal at said first two points the axis of the third opening will be aligned with the axis of flow of said fluid stream.

11. Fluid flow indicating and measuring means of the class described, comprising in combination a cylinder having two openings located at circumferentially spaced points on the arcuate periphery of said cylinder, said cylinder having two passages therein, each of said passages communicating respectively with one of said two openings, said cylinder having a third opening located at a third point on the arcuate periphery of said cylinder equally spaced circumferentially from said aforementioned two points, said cylinder having a third passage communicating with said third opening, said passages leading from said openings axially through said cylinder and communicating with the exterior thereof at points remote from said openings, said openings being arranged on the periphery of said cylinder in such a manner that when the pressures are equal at both of said first two points the influence of dynamic pressure of a fluid stream within which said cylinder is positioned will be negligible at either of said two points and the total pressure of said fluid stream will be applied at said third opening, an indicator member fixed to said cylinder and correlated with the position of said third opening with respect to said cylinder, and fixed indicia means cooperable with said indicator member to indicate the position of said third opening with respect to said indicia means upon rotation of the cylinder about its longitudinal axis relative to said indicia means.

12. Fluid flow indicating and measuring means of the class described comprising, in combination, a receiver body having an arcuate periphery and two openings therein located at circumferentially spaced points on said arcuate periphery, said receiver body having two passages therein each communicating respectively with one of said two openings, said passages leading from the respective openings through said body and communicating with the exterior thereof at points remote from said openings and being adapted for connection at said remote points with means for indicating the pressure differential, at said circumferentially spaced points, of a fluid stream within which said body is positioned, said body having a third opening located at a third point of the arcuate periphery on said body equally spaced circumferentially from said aforementioned two points, said body having a third passage communicating with and leading from said third opening through said body and communicating with the exterior thereof at a point remote from said third opening and being adapted for communication at said remote point with means for indicating the pressure of said fluid stream at said third point, means supporting said body for rotation about the axis of the arc of curvature thereof, an indicator member fixed to said body for indicating the position of the third opening with respect to said body, and a circular member surrounding said body and having indicia thereon cooperable with said indicator member to indicate the position of the third opening with respect to the circular member upon rotation of said body about said axis, said circular member having a slot extending inwardly from the periphery thereof, and means extending parallel with the axis of said body and engaging said slot whereby the circular member may be moved axially of said body while prevented from rotation relative thereto.

13. A device of the class described comprising a hollow cylinder, a plurality of hollow tubes enclosed within said cylinder, said cylinder and said tubes having their axes arranged substantially parallel, said cylinder having a plurality of openings in its arcuate periphery spaced arcuately approximately 80 degrees, a solid body of material sealing one end of said cylinder and the corresponding ends of said tubes, said material having passages therein each communicating with one of the respective tubes and with a respective opening in said cylinder and said material having another passage therein communicating with another opening in said cylinder and with the exterior of said body of material, said last mentioned opening being intermediate the first mentioned openings and equally spaced therefrom.

14. A device of the class described comprising a hollow cylinder, a plurality of hollow tubes enclosed within said cylinder, said cylinder and said tubes having their axes arranged substantially parallel, said cylinder having a plurality of openings in its arcuate periphery spaced arcuately approximately 80 degrees, a solid body of material sealing one end of said cylinder and the corresponding ends of said tubes, said material having passages therein each communicating with one of the respective tubes and with a respective opening in said cylinder, a second body of material in said cylinder spaced from said first body and sealing the space between said bodies from the outside, said tubes extending through said second body and communicating with the outside of said cylinder, and another tube extending through said second body and communicating with the space between said bodies and with the outside of said cylinder, said first body having another passage therein communicating with the space between said bodies and with another opening in the arcuate periphery of said cylinder, said last mentioned opening being intermediate the first mentioned openings and equally spaced therefrom.

15. Fluid flow indicating and measuring means of the class described, comprising a receiver body having an arcuate periphery and two openings therein located at circumferentially spaced points on said arcuate periphery, said receiver body having two passages therein each communicating respectively with one of said two openings, said body having a third opening located at a third point on the arcuate periphery of said body equally spaced circumferentially from said aforementioned two points, said body having a third passage communicating with said third opening, said passages leading from the respective openings through said body and communicating with the exterior thereof at points remote from said openings, said openings being arranged on the periphery of the body in such a manner that when the pressures are equal at both of said first two points the influence of dynamic pressure of a fluid stream within which said body is positioned will be negligible at either of said first two points and the total pressure of said fluid stream will be applied at the third opening, and means communicating with said third passage for indicating total pressure of said fluid stream when the pressure at both of said first two points are equal.

16. Fluid flow indicating and measuring means of the class described, comprising a receiver body having an arcuate periphery and two openings therein located at circumferentially spaced points on said arcuate periphery, said receiver body having two passages therein each communicating respectively with one of said two openings, said body having a third opening located at a third point on the arcuate periphery of said body equally spaced circumferentially from said aforementioned two points, said body having a third passage communicating with said third opening, said passages leading from the respective openings through said body and communicating with the exterior thereof at points remote from said openings, said openings being arranged on the periphery of the body in such a manner that when the pressures are equal at both of said first two points the influence of dynamic pressure of a fluid stream within which said body is positioned will be negligible at either of said first two points and the total pressure of the fluid stream will be applied at said third opening, means communicating with said first two passages for indicating the pressure differential of the fluid stream at said first two points, and means communicating with said third passage for indicating the total pressure of said fluid stream when said pressure differential between said first two points is substantially zero.

17. Fluid flow indicating and measuring means of the class described, comprising a receiver body having an arcuate periphery and two openings therein located at circumferentially spaced points on said arcuate periphery, said receiver body having two passages therein each communicating respectively with one of said two openings, said body having a third opening located at a third point on the arcuate periphery of said body equally spaced circumferentially from said aforementioned two points, said body having a third passage communicating with said third opening, said passages leading from the respective openings through said body and communicating with the exterior thereof at points remote from said openings, said openings being arranged on the periphery of the body in such a manner that when the pressures are equal at both of said first two points the influence of dynamic pressure of a fluid stream within which said body is positioned will be negligible at either of said first two points and the total pressure of the fluid stream will be applied at said third opening, means communicating with said first two passages for indicating the pressure differential of the fluid stream at said first two points, means communicating with one of said first two passages and with said third passage for indicating the dynamic pressure of said fluid stream when said pressure differential between said first two points is substantially zero, and means communicating with one of said first two passages for indicating the static pressure of said fluid stream when said pressure differential between said first two points is substantially zero.

18. Fluid flow indicating and measuring means of the class described, comprising a receiver body having an arcuate periphery and two openings therein located at circumferentially spaced points on said arcuate periphery, said receiver body having two passages therein each communicating respectively with one of said two openings, said body having a third opening located at a third point on the arcuate periphery of said body equally spaced circumferentially from said aforementioned two points, said body having a third passage communicating with said third opening, said passages leading from the respective openings through said body and communicating with the exterior thereof at points remote from said openings, said openings being arranged on the periphery of the body in such a manner that when the pressures are equal at both of said first two points the influence of dynamic pressure of a fluid stream within which said body is positioned will be negligible at either of said first two points and the total pressure of the fluid stream will be applied at said third opening, means communicating with said first two passages for indicating the pressure differential of the fluid stream at said first two points, means communicating with said third passage for indicating the total pressure of said fluid stream when said pressure differential between said first two points is substantially zero, and means communicating with one of said first two passages for indicating the static pressure of said fluid stream when said pressure differential between said first two points is substantially zero.

19. Fluid flow indicating and measuring means of the class described, comprising a receiver body having an arcuate periphery and two openings therein located at circumferentially spaced points on said arcuate periphery, said receiver body having two passages therein each communicating respectively with one of said two openings, said body having a third opening located at a third point on the arcuate periphery of said body equally spaced circumferentially from said aforementioned two points, said body having a third passage communicating with said third opening, said passages leading from the respective openings through said body and communicating with the exterior thereof at points remote from said openings, said openings being arranged on the periphery of the body in such a manner that when the pressures are equal at both of said first two points the influence of dynamic pressure of a fluid stream within which said body is positioned will be negligible at either of said first two points and the total pressure of the fluid stream will be applied at said third opening, means communicating with said first two passages for indicating the pressure differential of the fluid stream at said first two points, means communicating with one of said first two passages and with said third passage for indicating the dynamic pressure of said fluid stream when said pressure differential between said first two points is substantially zero, and means communicating with said third passage for indicating the total pressure of said fluid stream when said pressure differential between said first two points is substantially zero.

20. Fluid flow indicating and measuring means of the class described, comprising a receiver body having an arcuate periphery and two openings therein located at circumferentially spaced points on said arcuate periphery, said receiver body having two passages therein each communicating respectively with one of said two openings, said body having a third opening located at a third point on the arcuate periphery of said body equally spaced circumferentially from said aforementioned two points, said body having a third passage communicating with said third opening, said passages leading from the respective openings through said body and communicating with the exterior thereof at points remote from said openings, said openings being arranged on the periphery of the body in such a manner that when the pressures are equal at both of said first two points the influence of dynamic pressure of a fluid stream within which said body is positioned will be negligible at either of said first two points and the total pressure of the fluid stream will be applied at said third opening, means communicating with said first two passages for indicating the pressure differential of the fluid stream at said first two points, means communicating with one of said first two passages and with said third passage for indicating the dynamic pressure of said fluid stream when said pressure differential between said first two points is substantially zero, means communicating with one of said first two passages for indicating the static pressure of said fluid stream when said pressure differential between said first two points is substantially zero, and means communicating with said third passage for indicating the total pressure of said fluid stream when said pressure differential between said first two points is substantially zero.

MORTON ALPERIN.